US011855809B2

(12) United States Patent
Hegde et al.

(10) Patent No.: US 11,855,809 B2
(45) Date of Patent: *Dec. 26, 2023

(54) RESILIENT ZERO TOUCH PROVISIONING

(71) Applicant: HEWLETT PACKARD ENTERPRISE DEVELOPMENT LP, Houston, TX (US)

(72) Inventors: Sanjay Kaniyoor Surendra Hegde, Bangalore (IN); Isaac Theogaraj, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/672,406

(22) Filed: Feb. 15, 2022

(65) Prior Publication Data

US 2022/0200821 A1 Jun. 23, 2022

Related U.S. Application Data

(63) Continuation of application No. 16/918,019, filed on Jul. 1, 2020, now Pat. No. 11,277,283.

(30) Foreign Application Priority Data

Aug. 30, 2019 (IN) .............................. 201941035057

(51) Int. Cl.
| H04L 12/66 | (2006.01) |
| H04L 12/28 | (2006.01) |
| H04L 12/46 | (2006.01) |
| H04L 61/5014 | (2022.01) |

(52) U.S. Cl.
CPC .......... *H04L 12/66* (2013.01); *H04L 12/2859* (2013.01); *H04L 12/4645* (2013.01); *H04L 61/5014* (2022.05)

(58) Field of Classification Search
CPC . H04L 12/66; H04L 61/5014; H04L 12/2859; H04L 12/4645
See application file for complete search history.

(56) References Cited

U.S. PATENT DOCUMENTS

| 6,526,052 B1 * | 2/2003 | Rijhsinghani ....... H04L 12/4645 |
| | | 370/389 |
| 10,938,855 B1 | 3/2021 | Waldie et al. |
| 2007/0183314 A1 * | 8/2007 | Li ........................... H04L 45/22 |
| | | 370/217 |

(Continued)

*Primary Examiner* — Mohamed A. Wasel
(74) *Attorney, Agent, or Firm* — Hewlett Packard Enterprise Patent Department

(57) ABSTRACT

An example branch gateway includes processing circuitry, memory including instructions, and a plurality of ports. The branch gateway transmits, from a plurality of ports, a first broadcast message. The branch gateway receives, in response to the first broadcast message, response messages on respective ports. The branch gateway determines, based on a receipt order of the response messages, an identifying address from a first response message. The branch gateway assigns the respective port for each response message to a unique VLAN. The branch gateway determines, for each port assigned to a unique VLAN, a link health parameter. The branch gateway selects a primary port to connect to an activation server of a WAN. The branch gateway selects a secondary port to connect to the activation server.

20 Claims, 4 Drawing Sheets

(56) References Cited

U.S. PATENT DOCUMENTS

| | | |
|---|---|---|
| 2009/0304008 A1 | 12/2009 | Kono et al. |
| 2018/0034698 A1 | 2/2018 | Perez et al. |
| 2019/0190839 A1 | 6/2019 | Hsieh et al. |
| 2019/0238539 A1 | 8/2019 | Arora et al. |
| 2019/0342262 A1 | 11/2019 | Peng |
| 2020/0044917 A1 | 2/2020 | Peng |
| 2020/0235898 A1 | 7/2020 | Loehr et al. |

* cited by examiner

RESILIENT ZERO TOUCH PROVISIONING

CROSS REFERENCE TO RELATED APPLICATIONS

This application is a continuation of U.S. patent application Ser. No. 16/918,019, filed on Jul. 1, 2020, which claims priority to IN Patent Application No. 201941035057 filed on Aug. 30, 2019 the contents of which are incorporated herein by reference in their entirety.

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to form the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and headend gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and headend gateways) controls certain aspects of routing for their respective LAN, but a network orchestrator controls the overall switching and routing across the WAN.

Zero touch provisioning (ZTP) is used in situations where a network administrator may not be available to configure a network infrastructure device. Devices capable of ZTP automatically retrieve their network configuration from an activation server upon initial provisioning of the device. ZTP does not literally mean "zero touch," but ZIP enabled devices do not require configuration of the device by a local administrator beyond plugging the device into the WAN.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
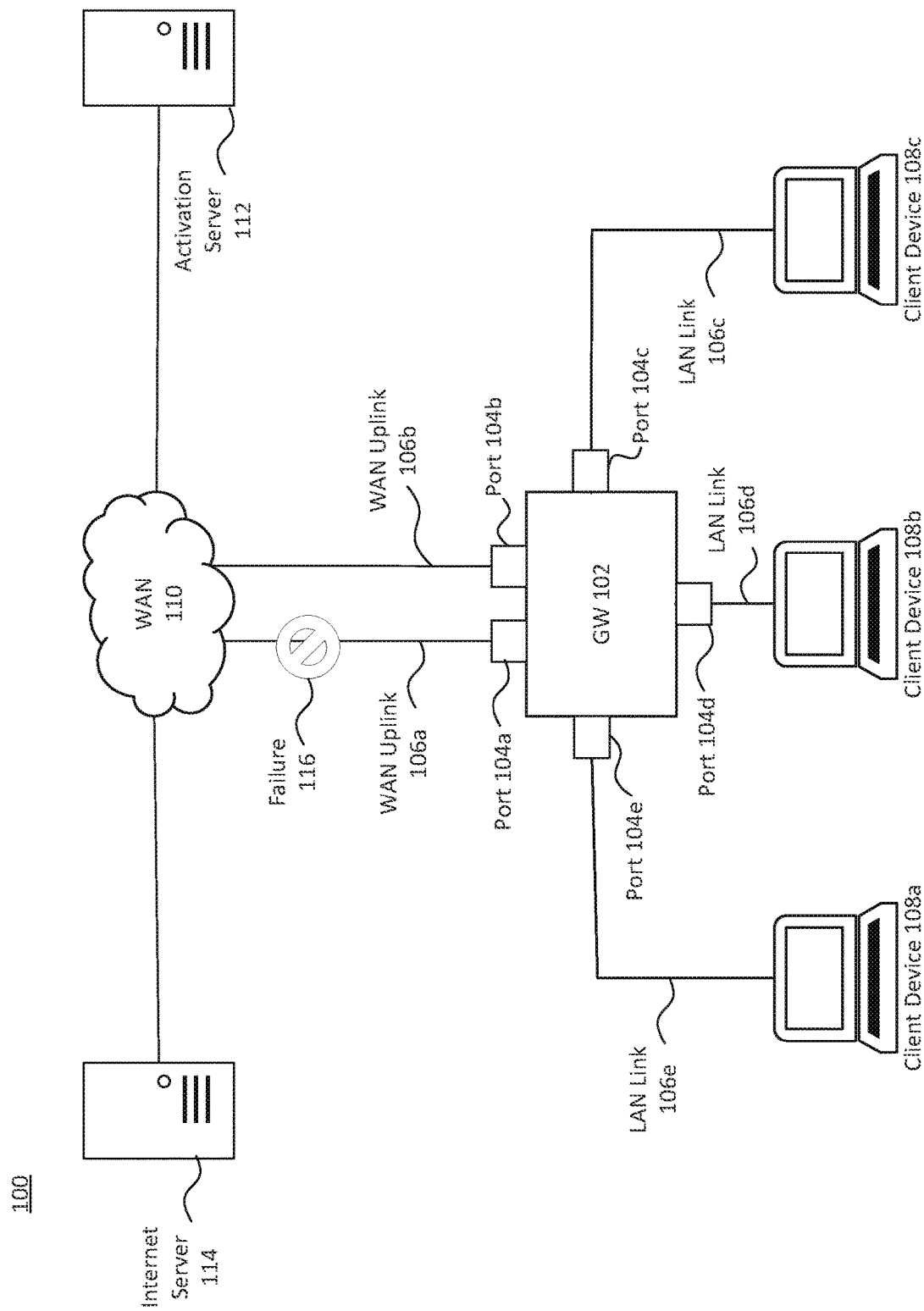
FIG. 1 illustrates an example wide area network including a zero touch provisioning capable branch gateway.

Certain examples have features that are in addition to or in lieu of the features illustrated in the above-referenced figures. Certain labels may be omitted from certain figures for the sake of clarity.

DETAILED DESCRIPTION

Many network infrastructure devices, such as access points, controllers, gateways, and combination devices, are capable of reduced configuration provisioning, one touch provisioning, zero touch provisioning (ZTP) or other minimal configuration provisioning processes. Throughout this disclosure, reference is made to ZTP. However, it would be understood by a person having ordinary skill in the art that features of this disclosure apply equally to other minimal configuration provisioning processes.

Often, ZTP is enabled by preloading an initialization procedure onto the device. This is not unique to ZTP capable devices, but the procedure is altered in comparison to a traditional provisioning device so as to avoid requiring network administrator intervention. Often, a ZTP initialization procedure includes selecting an operational wide area network (WAN) uplink, establishing a connection with an activation server and downloading provisioning parameters offered by the activation server. Then, the ZIP initialization procedure installs and initializes the configuration included in the provisioning parameters, much like a traditional provisioning procedure.

Since details of the network context (e.g. network topology) of a ZTP capable device are unknown at the time of preloading (which is often done during manufacture of the device), the provisioning configuration preloaded on the device makes certain assumptions about the operation of the network that may not be accurate in specific circumstances. For example, a branch gateway may initialize and provision using an uplink connected to the first uplink port of the branch gateway, even if other uplinks are available to the branch gateway. This may result in failure of provisioning if the uplink of the first uplink port fails or is misconfigured.

Many ZTP capable devices, upon detecting the misbehaving primary uplink, may revert to a traditional provisioning procedure, often by displaying an error to the network administrator. The network administrator then manually configures the device, resolving the uplink issue during the configuration process. In situations where a professional network administrator is on-site, this manual configuration process is inconvenient. However, in situations where there is no professional network administrator on-site (e.g. a small branch office, a work from home employee such a failure may substantially impact business operations.

In a software defined wide area network (SD-WAN), a branch site may have multiple uplinks to the broader WAN. In some networks, a provisioned branch gateway may make use of more than one uplink to connect with the broader WAN. This provides high availability (HA) capability to the branch gateway. Such a provisioned branch gateway may use one or more uplinks as active connections and one or more uplinks as idle standby connections. This is an "active-standby" configuration. Alternatively, a provisioned branch gateway may use all uplinks as active connections, routing data traffic dynamically through uplinks. This is an "active-active" configuration. In many branch gateway devices across the industry, configuring multiple uplinks, whether in active-standby or active-active configuration may require substantial manual intervention from a network administrator. However, some recent branch gateway devices have reduced the manual intervention required by the network administrator to configure the high availability features.

An example branch gateway is connected to multiple uplinks prior to provisioning. Although this disclosure generally describes example branch gateways connected to a pair of uplinks. However, a person having ordinary skill in the art would recognize that the features in this disclosure apply equally to a branch gateway connected to any number of uplinks. Since the branch gateway is not yet provisioned, the branch gateway is not aware of the network topology and other required information necessary for implementing a full high-availability configuration to operate within the broader WAN. Instead, the branch gateway first contacts an activation server to retrieve provisioning parameters and install the provisioning parameters. Additional initialization may occur during the provisioning phase beyond installing the provisioning parameters. In some examples, the branch gateway reboots upon installing the configuration. In some other examples, the branch gateway initializes the configuration after installing without an intervening reboot of the gateway.

Since the network topology is unknown to the branch gateway, the gateway has no guidance as to where to contact the activation server and which port(s) have a functioning connection to the WAN. Rather than simply assume that the uplink connected to the first uplink port of the branch gateway is a functioning connection to the WAN, the branch gateway determines which port is best suited to contact the activation server.

When the branch gateway is initialized in a pre-provisioned status, all interfaces are configured with the same VLAN (e.g. VLAN 1). In examples consistent with this disclosure, rather than a single highest priority uplink being selected for the branch gateway, the gateway, being configured for ZTP, broadcasts a message (e.g. a DHCP Discover) across VLAN 1. The message is thus transmitted through links connected to interfaces of the branch gateway. Servers (e.g. DHCP servers) across the WAN (including any servers on the LAN side of the branch gateway) respond to the broadcast with messages (e.g. DHCP Offers) including information used to establish a pre-provisioning configuration on the branch gateway to allow the branch gateway to connect to the activation server.

The branch gateway receives the response messages in a certain order based on the conditions of the network at the respective links. The branch gateway then assigns new, unique VLANs to the ports respectively associated with the received response messages. For example, a first unique VLAN is assigned to the port of the first received message, a second unique VLAN is assigned to the port of the second received message, and so forth. In some examples, the set of VLANs assigned to the ports is a contiguous set associated with activation of the branch gateway.

The information received in the first response message is applied to the branch gateway (e.g. IP address for the first unique VLAN is set), but in some examples, the additional response messages cannot be applied to the additional VLANs. In such examples, after the branch gateway assigns the responding ports to unique VLANs, the branch gateway generates and broadcasts new messages (e.g. DHCP Discovers) on each of the unique VLANs beyond the first unique VLAN. Upon receiving the second round of responses for the additional VLANs, information received in the response messages are applied to the branch gateway (e.g. IP addresses for the other unique VLANs are set).

Although the branch gateway has now identified a set of ports connected to network addressing servers (e.g. DHCP servers), not all ports may be able to access the activation server. For example, a branch may host a local DHCP server, which would provide a response message at a LAN-facing port of the branch gateway (which the branch gateway may not be aware is a LAN-facing port). The LAN-facing port would not be able to directly access WAN-side servers.

The branch gateway then transmits a health check message (e.g. an ICMP to a known-available Internet server, an ICMP to the activate server, etc.) for each port corresponding to a unique VLAN and retrieves link health parameters from received reply messages to the health check messages. LAN-facing ports with no connectivity to the broader WAN time out without sending a reply message, but all WAN-facing ports with a healthy WAN connection receive reply messages. Based on the order of receipt of the reply messages, the port of the first received reply message is used to connect to the activate server and download the provisioning parameters for the branch gateway.

In an example where a primary uplink is partially operational such that the branch gateway can access a network addressing server (e.g. DHCP server), but cannot access broader WAN services (such as the activation server or the known-available Internet server) and a second uplink is fully operational, the branch gateway may receive the network addressing response message from the primary uplink first, but may not receive a reply to the health check message. In such situations, the branch gateway may connect to the activation server via the secondary uplink. Similarly, if the primary uplink fails during connection with the activation server, the branch gateway may reconnect to the activation server via the secondary uplink. In some examples, the branch gateway may establish multiple connections with the activation server across each healthy uplink and download the provisioning parameters using all healthy uplinks.

FIG. 1 illustrates an example wide area network including a zero touch provisioning capable branch gateway. Software defined wide area network (SD-WAN) 100 includes branch gateway (GW) 102 including ports 104, network links 106, client devices 108, WAN 110, activation server 112, and Internet server 114. Failure 116 occurs on WAN Uplink 106*a*. Client Devices 108*a*, *b*, and *c* connect to GW 102 via LAN links 106*e*, *d*, and *c*, and ports 104*e*, *d* and *c*, respectively. GW 102 is connected to WAN 110 via a pair of uplinks, WAN Uplink 106*a* and WAN Uplink 106*b* connected to GW 102 at ports 104*a* and 104*b*, respectively. Activation server 112 and Internet server 114 are accessible to the branch site (e.g. the site including GW 102 and Client Devices 108*a*) via WAN 110.

GW 102 is a branch gateway that interfaces the branch site to WAN 110. GW 102 may be a site controller, such as a branch office controller, that is capable of zero touch provisioning (ZTP). In an initial, unconfigured state (e.g. factory condition, factory reset, unprovisioned, etc.), GW 102 is not aware of the topology of SD-WAN 100, and may only know that links 106*a-e* are connected to ports 104*a-e*, respectively. In some examples, GW 102 does not know which links 106 are LAN links and which links 106 are WAN Uplinks. In some examples, GW 102 knows that certain ports (e.g. ports 104*a-b*) are uplink ports and other ports (e.g. ports 104*c-e*) are LAN link ports. In order to transition from the unconfigured state to a configured state, GW 102 establishes a connection with activation server 112 and downloads provisioning parameters to apply to GW 102.

However, without additional information about the network topology and an address, GW 102 has no way to contact activation server 112.

In an example, upon initialization, GW 102 operates with a single virtual local area network (VLAN) (e.g. VLAN 1). All ports 104 belong to VLAN 1, and thus broadcast messages at GW 102 are forwarded through all ports 104, GW 102 may create and forward a broadcast message on VLAN 1, forwarding the broadcast message through ports 104*a-e*. In some examples, the broadcast message is a DHCP Discover message including information such as a MAC address of GW 102. Although this disclosure describes initializing GW 102 using DHCP messages, a person having ordinary skill in the art would recognize that any of a number of types of messages could be used to achieve the features of this disclosure. One or more links 106 may route to a DHCP server that, upon receiving the DHCP Discover message, generates a response message (e.g. a DHCP Offer). In some examples, each link 106 with a DHCP server routes to a separate DHCP server. In some other examples, multiple links 106 may route to the same DHCP server, but the network performance across each link 106 routing to the same DHCP server may differ. As each DHCP Offer is received at each respective port 104 of GW 102, GW 102 may create an ordered list of Offers received and ports 104 the Offers were received at. For example, GW 102 may receive an Offer at port 104*a* first, port 104*e* second, and port 104*b* third. All other ports may not receive Offers in response to the Discover message.

GW 102 then selects a first response message (the Offer from port 104*a* in the preceding example) and assigns the respective port (e.g. port 104*a*) to a unique VLAN (e.g. VLAN 4094). GW 102 also applies information received in the first response message (e.g. an IP address) to GW 102, and specifically to the unique VLAN (VLAN 4094).

Similarly to the first response message, subsequently received response messages are selected by GW 102 and their respective ports 104 are assigned to unique VLANS (e.g. VLAN 4093, 4092, etc.). However, in some examples, the information received in the subsequently received response messages cannot be used to apply to the respective unique VLANs. In such examples, GW 102 broadcasts a second round of broadcast messages, each on the respective unique VLAN and via the respective port 104 of the subsequently received response messages of the first round of broadcast messages. Upon receiving the second round of response messages, GW 102 applies the information received in each response message to the respective unique VLAN.

Even though unique VLANs have been established for each network addressable port 104, and even though servers have responded to broadcast messages on each network addressable port 104, not all links 106 are able to connect to WAN 110. For example, a LAN-side DHCP server may respond to a broadcast message sent via port 104*e* across LAN link 106*e*, but network traffic across LAN link 106*e* is not able to reach WAN 110 or servers 112 and 114 without passing back through port 104*e*, through GW 102, and through WAN Uplink 106*a* or 106*b*. In order to determine which links are able to connect to WAN 110, GW 102 transmits a health check message across each network addressable port 104. For example, if ports 104*a*, 104*b*, and 104*e* are the network addressable ports, GW 102 transmits health check messages across WAN Uplink 106*a*, WAN Uplink 106*b*, and LAN Link 106*e*. In some examples, the health check messages transmitted by GW 102 are ICMP messages destined for a known-available IP address or URL (e.g. www.google.com, activate.arubanetworks.com, etc.) corresponding to an Internet server 114 or to an activation server 112. Reply messages are received at certain of the network addressable ports 104 that are able to connect to WAN 110. For example, a reply message may be received at port 104*b* because WAN Uplink 106*b* is operational and connects to WAN 110, which is able to route messages to and from Internet server 114 and activation server 112. In such an example, no reply message may be received at port 104*e* because LAN link 106*e* is unable to connect to WAN 110 and thus the health check message cannot be routed to its destination via port 104*e*. Also, in such an example, no reply message may be received at port 104*a* because WAN uplink 106*a* is experiencing failure 116, which may prevent the health check message from being routed to its destination. In another example, a reply message may be received at port 104*a* because failure 116 has not yet happened, but failure 116 may occur later.

In some examples, once the reply messages are received, GW 102 creates an ordered list of uplinks based on the order in which the reply messages are received. For example, if a reply message is received first at port 104*a* and second at port 104*b*, port 104*a* is first in the ordered list and port 104*b* is second in the ordered list.

GW 102 selects a primary uplink 106*a* based on the order in which the reply messages are received, the uplink 106 of the first received reply message being selected as the primary uplink 105*a*. Once the primary uplink 106*a* is selected, a connection is created between GW 102 and activation server 112 via port 104*a*, WAN uplink 105*a*, and WAN 110. GW 102 transmits identifying information to activation server 112, and activation server 112 downloads provisioning parameters to GW 102. GW 102 then installs the provisioning parameters. In some situations, the primary uplink 106*a* may have a failure 116 during the download of the provisioning parameters. In such situations, GW 102 may select the secondary uplink 106*b* and establish a connection with activation server 112 through secondary uplink 106*b* to restart or continue the download of the provisioning parameters.

In certain examples, GW 102 may establish connections with activation server 112 through some or all of the operational uplinks 106*a-b* and download the provisioning parameters in portions across each of the uplinks 106*a-b*. In such examples, data traffic across the GW 102 to activation server 112 connection may be load balanced across the uplinks 106*a-b* to best use available bandwidth. If, in such examples, a failure 116 occurs on one of the active uplinks 106*a*, the remaining operational uplinks 106*b* may continue downloading the provisioning parameters.

Figure 2:
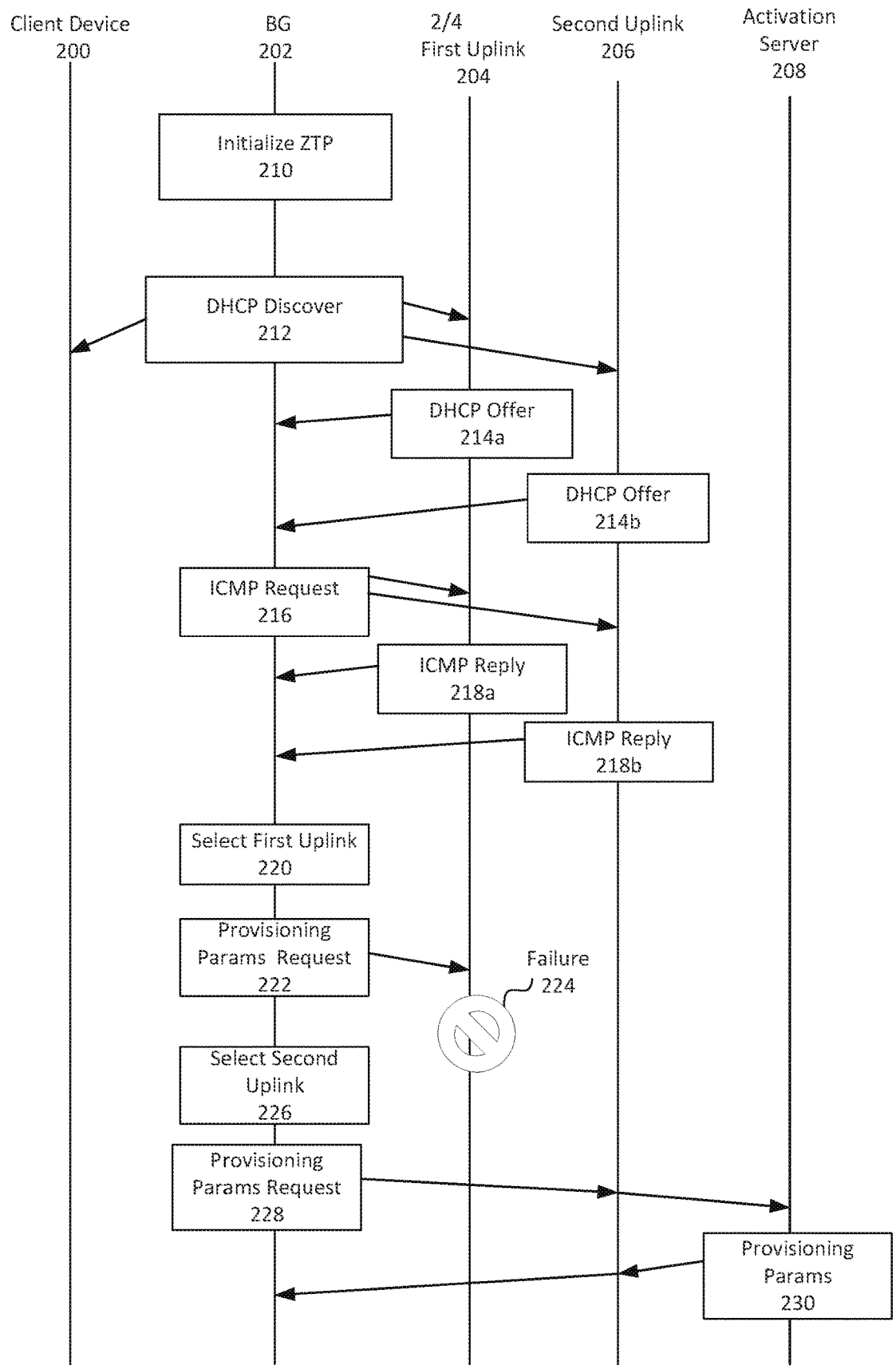
FIG. 2 is a signal flow diagram illustrating operation of an example wide area network including zero touch provisioning of a branch gateway.

FIG. 2 is a signal flow diagram illustrating operation of an example wide area network including zero touch provisioning of a branch gateway. Client device 200 is a LAN-side device connected to branch gateway (BG) 202. BG 202 is coupled via ports to first uplink 204 and second uplink 206 which each provide WAN-side connectivity to activation server 208.

BG 202, upon booting in an unconfigured state, initializes zero touch provisioning (ZTP) 210. In some examples, BG 202 may check the integrity and security of the device.

BT 202 then generates a DHCP Discover message 212 and broadcasts message 212 across all ports of BS 202, including ports to client device 200, first uplink 204 and second uplink 206. The DHCP Discover message may be broadcast across a first VLAN of the BG (e.g. VLAN 1) of which all ports are a member.

DHCP servers are reachable on certain ports by message 212, and when DHCP servers connected to first uplink 204 and second uplink 206 receive message 212, they generate DHCP Offer messages 214 in reply. Messages 214 include assigned IP addresses for BG 202. Upon receiving messages 214, BG 202 selects a first uplink based on the first received message 214a (e.g. first uplink 204).

BG 202 may then assign each responsive uplink 204 and 206 to unique VLANS, and assign IP addresses from messages 214 to the respective VLANs. In some examples, the IP address from the first received message 214a is assigned to the appropriate VLAN, but an additional DHCP Discover message is sent to the second uplink 206 after the appropriate port is assigned to the appropriate VLAN to solicit a new DHCP Offer from the DHCP server of second uplink 206 in order to assign an IP address to the appropriate VLAN.

In order to determine a primary uplink, BG 202 transmits ICMP requests 216 across each port that has been assigned a unique VLAN (e.g. to first uplink 204 and second uplink 206). The ICMP requests 216 may be destined for a known-available IP or URL, such as google.com or activate.arubanetworks.com. The internet servers receiving the ICMP requests 216 generate and return ICMP Replies 218a and 218b to BG 202.

BG 202, upon receiving ICMP reply 218a first, selects 220 the first uplink 204 as the primary uplink for provisioning. Upon receiving ICMP reply 218b second, BG 202 may store the second uplink 206 in a list of uplinks.

BG 202 then attempts to connect with activation server 208 to send 222 a config file request to activation server 208. However, since failure 224 has occurred on first uplink 204, the connection cannot be established, and the config file request is not received at activation server 208. Upon detecting the failure 224, BG 202 selects 226 the second uplink 206 as a new primary uplink. BG 202 may select the second uplink 206 by querying a list of secondary uplinks created when the ICMP replies 218 were received.

BG 202 then creates a connection with activation server 208 through second uplink 206 and sends 228 a config file request to activation server 208 through the connection. Activation server 208 then downloads 230 the config file to BG 202 for installation and execution.

Figure 3:
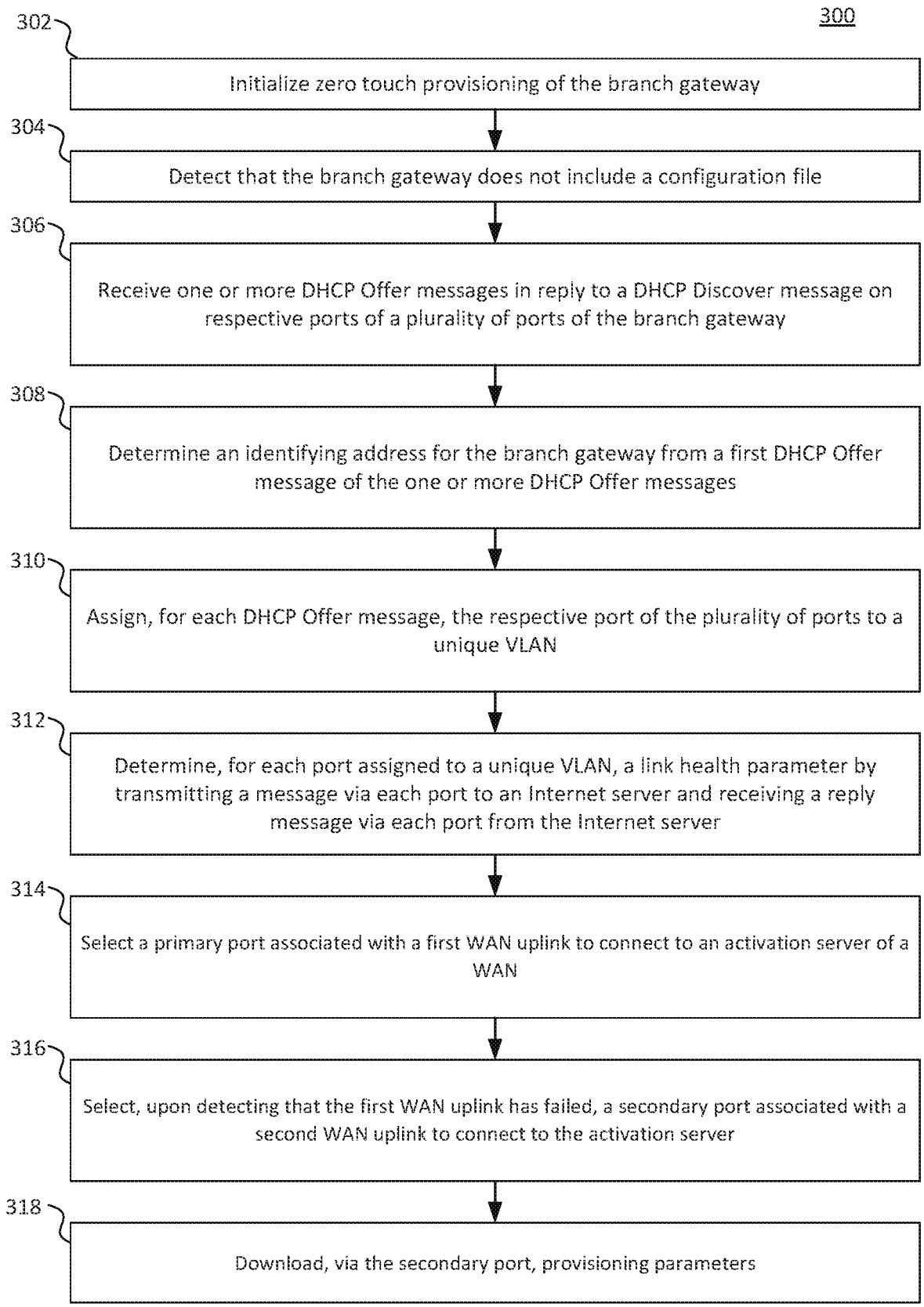
FIG. 3 is a flowchart illustrating an example method for zero touch provisioning a branch gateway.

FIG. 3 is a flowchart illustrating an example method for zero touch provisioning a branch gateway. Method 300 may be encoded as instructions on a computer readable medium in a branch gateway and executed by processing circuitry of the branch gateway.

In block 302, zero touch provisioning (ZTP) of the branch gateway is initialized. In some examples, initializing ZTP includes actions such as determining whether the device is a legitimate device, opening certain ports used by the ZTP process. Certain configuration may also occur in other devices across the WAN (e.g. the activation server, a network management device, etc.). The branch gateway may determine which ports of the gateway are coupled to links (e.g. uplinks, LAN-facing links).

In block 304, the branch gateway detects that provisioning parameters is not included in the branch gateway. In some examples, rather than detecting that no provisioning parameters is present, the branch gateway may detect that a factory default configuration is present. Provisioning parameters may include information, including flows and other configurations, which are compatible with a network topology of the WAN, and without provisioning parameters, the branch gateway may not be aware of how to connect to any WAN-based or Internet-based service.

In block 306, the branch gateway receives one or more DHCP Offer messages in reply to a DHCP Discover message on respective ports of a plurality of ports of the branch gateway. The branch gateway, transmits the DHCP Discover message across the plurality of ports to, among other things, determine which ports are connected to uplinks that are connected to DHCP servers. In some examples, the DHCP Discover message is broadcast across a default VLAN (e.g. VLAN 1) which includes all ports at initialization. The DHCP Discover may have an associated timeout that causes the branch gateway to cease processing DHCP Offer messages in response to the DHCP Discover after the timeout expires.

In block 308, the branch gateway determines an identifying address for the branch gateway from a first DHCP Offer message of the one or more DHCP Offer messages. The identifying address may be an IP address offered by the DHCP server. In some examples, the identifying address is applied to the branch gateway as a whole. In some other examples, the identifying address is applied to the respective port on which the first DHCP Offer is received. Block 308 may occur simultaneously to or after block 310 in some examples.

In block 310, the branch gateway assigns, for each DHCP Offer message, the respective port of the plurality of ports to a unique VLAN. As each DHCP Offer message is received, the branch gateway associates the port on which the message is received with the message itself. In some examples, the branch gateway stores the association in a list or other data structure. By assigning each port to a unique VLAN, messages can be broadcast to segments of the WAN without being broadcast out of all ports of the branch gateway, which allows for differentiation between ports.

In block 312, the branch gateway determines, for each port assigned to a unique VLAN, a link health parameter by transmitting a message via each port to an Internet server and receiving a reply message via each port from the Internet server. In some examples, the messages transmitted to the Internet server are ICMP messages sent to a known-active IP address or URL (e.g. www.google.com, activate.arubanetworks.com, etc.). The Internet server replies with a reply message to the port that sent the message. In some examples, a link health parameter may be the latency of the round-trip transit of the messages. For example, ICMP messages are sent simultaneously via each port assigned to a unique VLAN, and the link health parameter is the order in which the reply messages are received at each respective port. In some other examples, the link health parameter may be a value based on characteristics of the received reply messages.

In block 314, the branch gateway selects a primary port associated with a first WAN uplink to connect to an activation server of the WAN. Based on the link health parameter, the primary port is selected. For example, the port where the first reply message is received in block 312 is selected as the primary port. In some examples, an ordered list of ports and reply messages may be generated by the branch gateway upon receiving the reply messages. Connecting to the activation server may include establishing a session with the server via the first WAN uplink.

In block 316, the branch gateway, upon detecting that the first WAN uplink has failed, selects a secondary port associated with a second WAN uplink to connect to the activation server. In some examples, the secondary port was selected in block 314 in conjunction with selecting the primary port. In some other examples, the branch gateway references an ordered list of ports and selects the next port on the list. In certain examples, the first WAN uplink has been detected as failed because an attempt to establish a session with the server in block 314 has failed. In some other examples, the first WAN uplink has been detected as failed because of a transient failure that occurred after the session was established in block 314. Connecting to the activation server may include establishing a session with the server via the second WAN uplink.

In block 318, the branch gateway downloads, via the secondary port, provisioning parameters. In some examples, the activation server looks up the branch gateway in a data structure and selects or generates provisioning parameters based on information associated with the branch gateway.

Figure 4:
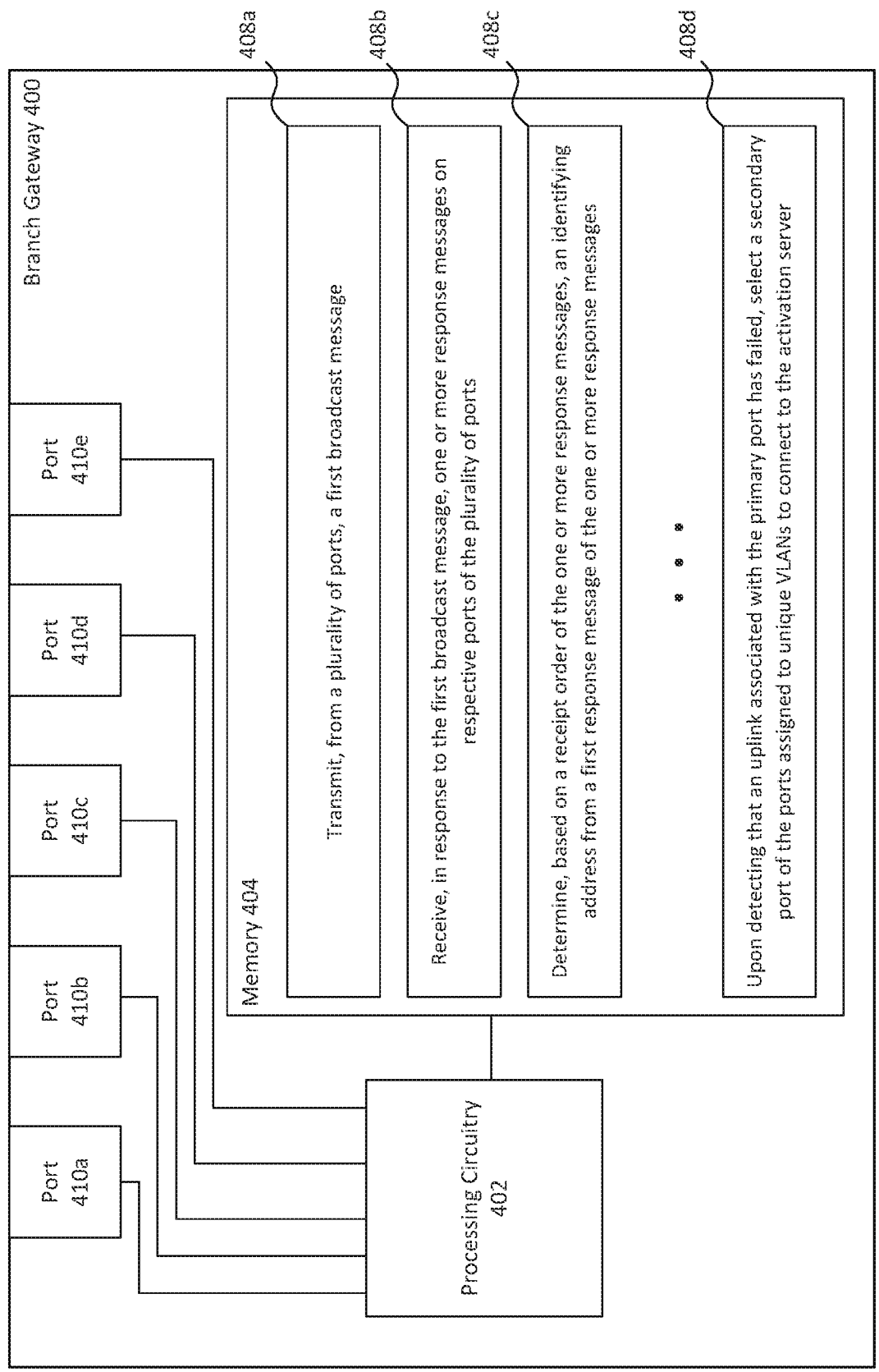
FIG. 4 illustrates an example branch gateway capable of zero touch provisioning.

FIG. 4 illustrates an example branch gateway capable of zero touch provisioning. Branch gateway 400 includes processing circuitry 402, memory 404 including instructions 408a-d, and ports 410a-e. When branch gateway 400 initializes in a pre-provisioned ZTP state, processing circuitry 402 executes instructions 408 from memory 404. Processing circuitry 402, in executing certain instructions 408, interacts with ports 410.

Ports 410 may be coupled to links (e.g. uplinks, LAN-facing links), although certain ports may not be coupled to links (e.g. a link may not be plugged into a certain interface). For example, ports 410a and 410b may be coupled to WAN uplinks and ports 410c and 410d may be coupled to LAN-facing links.

Memory 404 is a non-transitory, computer readable medium including instructions 408 that, when executed by processing circuitry 402, cause branch gateway 400 to undertake certain actions.

Instructions 408a cause branch gateway 400 to transmit, from a plurality of ports 410, a first broadcast message. The first broadcast message, in some examples, is a dynamic host configuration protocol (DHCP) Discover message.

Instructions 408b cause branch gateway 400 to receive, in response to the first broadcast message, one or more response messages on respective ports of the plurality of ports. In some examples, the one or more response messages are DHCP Offer messages.

Instructions 408c cause branch gateway 400 to determine, based on a receipt order of the one or more response messages, an identifying address from a first response message of the one or more response messages.

In some examples, additional instructions (not shown) cause branch gateway 400 to, for each response message of the one or more response messages, assign the respective port of the plurality of ports to a unique virtual local area network (VLAN).

In some examples, additional instructions (not shown) cause branch gateway 400 to determine, for each port assigned to a unique VLAN, a link health parameter. In some examples, all ports of the plurality of ports are initially assigned to VLAN 1. In some examples, determining a link health parameter includes transmitting a message via the respective port to an Internet server and receiving a reply message via the respective port from the Internet server. In some examples, ports assigned to unique VLANs include port 410a, which is associated with a first uplink to the WAN and port 410b, which is associated with a second uplink to the WAN. In such examples, port 410a and port 410b receive reply messages from the Internet server.

In some examples, additional instructions (not shown) cause branch gateway 400 to, based in part on the link health parameters of each port assigned to unique VLANs, select a primary port to connect to an activation server of a wide area network (WAN).

Instructions 408d cause branch gateway 400 to upon detecting that an uplink associated with the primary port has failed, select a secondary port of the ports assigned to unique VLANs to connect to the activation server.

An interface is a physical connection between a network infrastructure device and a network link. A port is a logical connection between a network infrastructure device and a network link and includes the interface. In certain situations, "interface" and "port" may be used synonymously, especially when referring to data traffic transmission throughout a network. It would be clear to a person having ordinary skill in the art when the logical aspects of a port/interface are implicated and when the physical aspects of a port/interface are implicated.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

Headend gateways (sometimes referred to as VPN concentrators) are network infrastructure devices that are placed at the edge of a core site LAN. Often headend gateways are routers that interface between the LAN and a wider network, whether it be directly to other LANs of the WAN via dedicated network links (e.g. MPLS) or to the other LANs of the WAN via the Internet through links provided by an Internet Service Provider connection. Many headend gateways can establish multiple uplinks to the WAN, both to multiple other LAN sites, and also redundant uplinks to a single other LAN site. Headend gateways also often include network controllers for the core site LAN. In such examples, a headend gateway in use in a SD-WAN may include a network controller that is logically partitioned from an included router. The network controller may control infrastructure devices of the core site LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A network administrator is a person, network service, or combination thereof that has administrative access to network infrastructure devices and configures devices to conform to a network topology.

A client device is a computing device that is operated or accessed by a network user. Client devices include laptop/desktop computers, tablets/phones/PDAs, servers, Internet of Things devices, sensors, etc.

A virtual local area network (VLAN) is a logical partition of a portion of a WAN. A VLAN may be contained within a certain LAN of the WAN or it may span across multiple LANs of the WAN. VLANs are implemented in layer 2 of the OSI model (the data link layer) and, among other benefits, improve network configurability as the size of the network scales. VLAN capable infrastructure devices may allocate VLANs on a per-port basis or may tag certain data frames with information associating the frames with their respective VLANs. VLANs may be used to group related devices, balance load on certain network infrastructure devices, apply security and routing policies on a broad basis, implement quality of service (QoS), etc.

A network infrastructure device is a device that receives network traffic and forwards the network traffic to a destination. Network infrastructure devices may include, among other devices, controllers, access points, switches, routers, bridges, and gateways. Certain network infrastructure devices may be SON capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

A software defined network (SDN) is a network overlaying a physical network that allows a device, such as a network orchestrator, to dynamically configure the topology of the SDN overlay using flows to specific routes through the underlay physical network. Dynamic configuration can include alterations to the network topology based on many factors, including network health and performance, data type, application type, quality of service restrictions (e.g., service level agreements), device load, available bandwidth, business cost, and other factors.

A software defined wide area network (SD-WAN) is a SDN that controls the interaction of various sites of a WAN. Each site may have one or more LANs, and LANs connect to one another via WAN uplinks. Some WAN uplinks are dedicated lines (e.g. MPLS), and others are shared routes through the Internet (e.g. DSL, T1, LTE, 5G, etc.). An SD-WAN dynamically configures the WAN uplinks and data traffic passing through the WAN uplinks to effectively use the resources of the WAN uplinks.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A switch, comprising:
   processing circuitry;
   a plurality of uplink ports;
   memory including instructions that, when executed by the processing circuitry, cause the switch to:
   in response to being initialized, send a broadcast message via a first virtual local area network (VLAN), wherein each uplink port of the switch is configured with the first VLAN;
   for each response message received on an uplink port responsive to the broadcast message, assign a new VLAN to the uplink port;

determine a parameter for each assigned uplink port via the corresponding new VLAN, wherein the parameter indicates health of a link coupling the assigned uplink port; and based on an order of the response message and the parameter for each assigned uplink port, select a primary port and a secondary port to connect to a wide area network (WAN).

2. The switch of claim 1, wherein the broadcast message is a dynamic host configuration protocol (DHCP) Discover message and the response message is a DHCP Offer message.

3. The switch of claim 1, wherein determining the parameter further comprises transmitting a message via the assigned uplink port and receiving a reply message via the assigned uplink port.

4. The switch of claim 3, wherein the primary port is associated with a first uplink to the WAN and the secondary port is associated with a second uplink to the WAN.

5. The switch of claim 3, wherein the primary port and the secondary port receive respective reply messages responsive to the transmitted message.

6. The switch of claim 1, wherein the instructions, when executed by the processing circuitry, further cause the switch to determine, based on the order of the response message, an network address for the new VLAN.

7. The switch of claim 1, wherein the instructions, when executed by the processing circuitry, further cause the switch to detect a failure of an uplink associated with the primary port and select the secondary port to connect to the WAN.

8. The switch of claim 1, wherein the instructions, when executed by the processing circuitry, further cause the switch to download, via the primary port, provisioning parameters for the switch from an activation server.

9. A method, comprising:
in response to a switch being initialized, sending, by the switch, a broadcast message via a first virtual local area network (VLAN), wherein each uplink port of the switch is configured with the first VLAN;
assigning, for each response message received on an uplink port responsive to the broadcast message, a new VLAN to the uplink port;
determining a parameter for each assigned uplink port via the corresponding new VLAN;
selecting, based on an order of the response message and the parameter for each assigned uplink port, a primary port and a secondary port to connect to a wide area network (WAN).

10. The method of claim 9, further comprising initializing zero-touch provisioning of the switch in response to detecting that the switch does not include provisioning parameters.

11. The method of claim 9, wherein the broadcast message is a dynamic host configuration protocol (DHCP) Discover message and the response message is a DHCP Offer message.

12. The method of claim 9, wherein determining the parameter further comprises transmitting a message via the assigned uplink port and receiving a reply message via the assigned uplink port.

13. The method of claim 12, wherein the primary port is associated with a first uplink to the WAN and the secondary port is associated with a second uplink to the WAN.

14. The method of claim 12, wherein the primary port and the secondary port receive respective reply messages responsive to the transmitted message.

15. The method of claim 9, further comprising:
detecting a failure of an uplink associated with the primary port; and
selecting the secondary port to connect to the WAN.

16. The method of claim 9, further comprising downloading, via the primary port, provisioning parameters for the switch from an activation server.

17. A computer system, comprising:
processing circuitry;
a plurality of uplink ports; and
a non-transitory, computer-readable medium including instructions that, when executed on the processing circuitry, cause the computer system to:
in response to the computer system being initialized, sending, by the computer system, a broadcast message via a first virtual local area network (VLAN), wherein each uplink port of the computer system is configured with the first VLAN;
assign, for each response message received on a respective uplink port responsive to the broadcast message, a new VLAN to the uplink port;
determine a parameter for each assigned uplink port via the corresponding new VLAN of the plurality of ports, wherein the parameter indicates health of a link coupling the assigned uplink port;
selecting, based on an order of the response message and the parameter for each assigned uplink port, a primary port and a secondary port to connect to a wide area network (WAN).

18. The computer system of claim 17, wherein the broadcast message is a dynamic host configuration protocol (DHCP) Discover message and the response message is a DHCP Offer message.

19. The computer system of claim 18, wherein determining the parameter further comprises transmitting a message via the assigned uplink port and receiving a reply message via the assigned uplink port.

20. The computer system of claim 17, wherein the instructions, when executed by the processing circuitry, further cause the computer system to download, via the primary port, provisioning parameters for the computer system from an activation server.

* * * * *